April 16, 1968

E. R. POLK ET AL 3,378,423

FUSED CONTAINER STRUCTURE AND METHOD
AND APPARATUS FOR PRODUCING IT
Filed Jan. 13, 1965

INVENTORS:
EDGWIN R. POLK
ANTONIO LA GRASSA
BY Breiterfeld & Levine

ATTORNEYS

United States Patent Office 3,378,423
Patented Apr. 16, 1968

3,378,423
FUSED CONTAINER STRUCTURE AND METHOD AND APPARATUS FOR PRODUCING IT
Edgwin R. Polk and Antonio La Grassa, Fords, N.J., assignors to Keene Packaging Associates, Elizabeth, N.J., a corporation of New Jersey
Filed Jan. 13, 1965, Ser. No. 425,209
4 Claims. (Cl. 156—273)

This invention relates generally to the fusing together, by high-frequency current, of structures composed at least partially of thermoplastic material, and has particular reference to a fused container and to an improved method and apparatus for making such a container.

The invention is primarily concerned with the manufacture of containers in the nature of luggage units, attaché cases, toilet cases, cosmetic and manicure boxes, jewelry cases, implement containers, and the like. Such items commonly consist of two complementary sections, each of which comprises a side wall and a cross wall, the sections being appropriately hinged or otherwise connected together. Each of the walls may consist of a form-retaining element of cardboard or the like, bearing a skin-like coating of thermoplastic materials. The manufacture of each section of the container includes the step of arranging the cross wall and the side wall in edge-to-edge relation, and fusing the thermoplastic material along the joint to form a unitary structure.

An illustrative method and apparatus for carrying out this process is described and illustrated in Patent No. 3,142,601. It is characterized by the employment of a special electrode having a concave face which bears against the joint to be fused, and creates an attractive product having an outwardly exposed convex curvature along the fused edge or corner. This type of procedure becomes difficult to employ, and the apparatus becomes inordinately expensive, when the general contour of the container is something other than a simple circle or rectangle, since the creation of a concave electrode surface along a non-circular curve is unusually costly.

It is a general object of this invention to obviate this shortcoming of the apparatus and procedure described in said patent, and to provide an improved method and means for producing a fused container structure, useful for a large variety of containers regardless of shape and configuration.

The achievement of the desired result is predicated upon a recognition of the fact that an electrode having a simple rectangular cross-section, and relatively thin, can be bent into almost any desired curvature without sacrifice of rigidity or effectiveness, and without involving any unusual expense. Such an electrode can be feasibly employed, and will produce a fused joint of unusual strength and attractiveness, where there is only a partial overlap of the peripheral edges that are to be fused together in edge-to-edge relation. Thus, if the margin of one of the wall sections is caused to overlap the end edge of the other only partially, an outwardly exposed reentrant angle or groove is formed within which the curved electrode can function.

It is a particular feature of the invention to bring the sections of the container in to a relationship of the character described, and to generate a fusing heat in a diagonal direction from the apex of the reentrant angle referred to inwardly toward the line of intersection of the inner surfaces of the container walls.

It is another feature of the invention to provide for the presence, along the region of fusion, of additional thermoplastic material which strengthens and thickens the fused region in an effective manner.

The objectives and advantages of the invention can be achieved in the manner illustratively shown in the accompanying drawings, in which.

Figure 4:
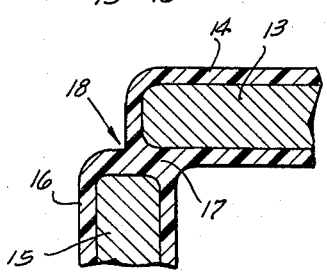
FIG. 4 is a view similar to FIG. 3, showing the container joint after fusion.
Figure 6:
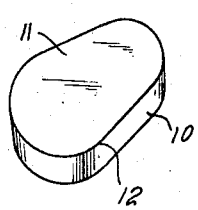
FIG. 6 is a perspective view of an illustrative container section or structure.

By way of example, the container structure shown in FIG. 6 is of generally oval configuration, involving a side wall 10 and a cross wall 11, the size and configuration of the cross wall 11 conforming substantially to the configuration into which the side wall 10 has been curved. It is the fusion of these walls along the joint 12 with which this invention is concerned. The nature of this fused joint is best illustrated in FIG. 4, in which it may be assumed that the cross wall 11 consists of an inner form-retaining element 13 of cardboard or the like, enveloped in a skin 14 of thermoplastic material, and the side wall 10 is similarly composed of an inner component 15 with a thermoplastic coating 16. The coatings 14 and 16 are fused together in the region 17, and there is exposed on the outside of the container structure a reentrant angle or groove 18.

Figure 1:
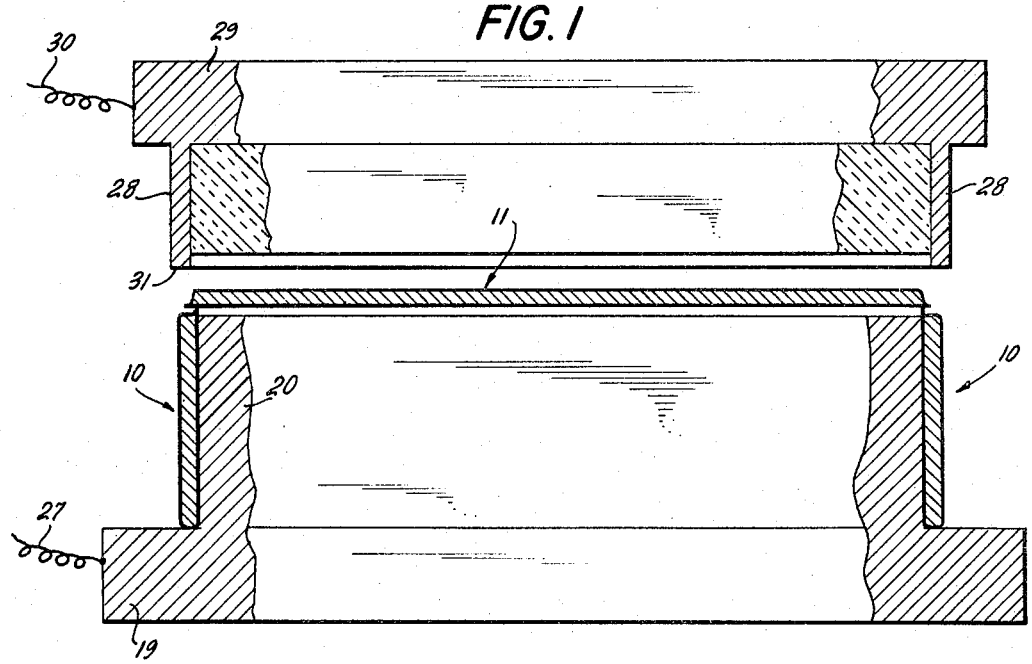
FIG. 1 is a simplified cross-sectional view of an apparatus embodying the features of this invention, showing how the side and cross walls of an illustrative container can be arranged in edge-to-edge relation just prior to fusing.
Figure 2:
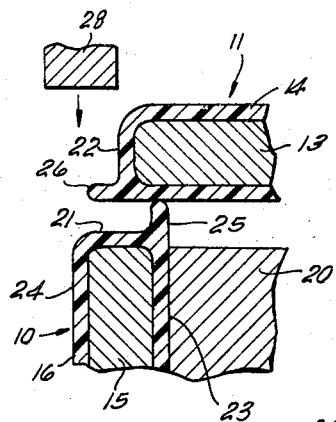
FIG. 2 is a greatly enlarged fragmentary view of the container corner shown at the left of FIG. 1.
Figure 3:
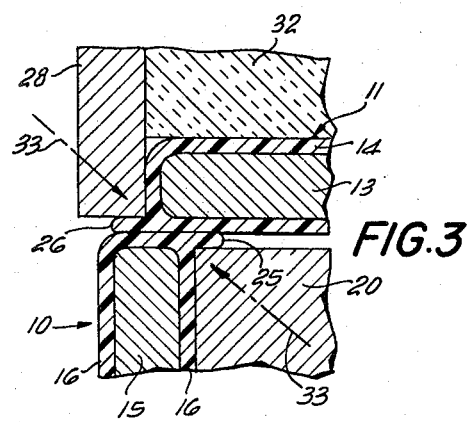
FIG. 3 is a view similar to FIG. 2 showing how the apparatus acts upon the corner.

The method of achieving this result is shown in FIGS. 1–3. On a suitable base or platen 19, a retaining structure 20 is provided, having a shape and contour which allows the side wall 10 to be mounted upon it with one peripheral edge facing upward as indicated at 21 in FIG. 2. With the side wall 10 thus held in place, the cross wall 11 is applied to it, and as indicated in FIG. 2 the marginal region of the cross wall overlaps the end edge 21 only partially. That is, the dimensions of the wall 11 are such that the end edge 22 extends beyond the inner surface 23 of the side wall 10, but does not reach as far as the outer surface 24.

Preferably the thermoplastic skin on the side wall 10 is formed with the projecting fin 25 adapted to come into contact with the lower surface of the cross wall 11, and the latter is similarly provided with a fin 26 adapted to come into contact with the peripheral edge 21 of the side wall 10. However, fins 25 and 26 may be omitted, if desired.

The retaining structure 20 and the base 19 are so designed that the corner regon of the structure 20, adjacent to the line of intersection of the inner surfaces of the walls 10 and 11, can serve as one of a pair of complementary electrodes. The connecting wire 27 indicated in FIG. 1 is intended to signify the circumstance that appropriate high-frequency electric current is fed to the corner region of the structure 20 when the apparatus is functioning.

The complementary electrode is indicated at 28 and is carried by an upper element or platen 29. The connecting wire 30 is intended to signify that the electrode 28 is supplied with appropriate high-frequency electric current. The electrode 28 has a simple rectangular cross-section, providing preferably a squared edge 31 adapted to move downwardly into the position shown in FIG. 3 when the platen 29 is moved toward the base or platen 19. It will be noticed that the electrode 28 fits snugly into the outwardly exposed reentrant angle that is formed when the wall sections are brought together as shown in FIG. 3.

Within the confines of electrode 28, it may be rigidified by a body 32 of non-conductive material. This body may or may not come into direct contact with the top surface of the cross wall 11, as shown in FIG. 3.

In accordance with this invention, a fusing heat is generated in the diagonal direction indicated by the arrows 33 in FIG. 3. This heat can be generated in any desired manner, e.g., by the passage of high frequency heating current as described in U.S. Patent No. 3,142,601. The heat causes the thermoplastic coatings 14 and 16 to fuse as indicated in FIG. 4, and the fins 25 and 26 provide additional thermoplastic material which strengthens and rigidifies the fused region 17.

Figure 5:
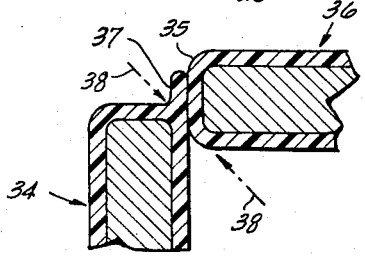
FIG. 5 is a view similar to FIG. 3 showing a possible modification.

While it is preferable to have the cross wall 11 overlap the peripheral edge of the side wall 10, as described above, it may under certain circumstances be desirable to arrange the walls in edge-to-edge relation as indicated in FIG. 5. In this case the upper marginal part of the side wall 34 is partially overlapped across the end edge 35 of the cross wall 36. A thermoplastic fin 37 may be advantageously provided, as shown, and the fusing heat is generated along the direction of the arrows 38. As before, the partial overlapping of the walls at their meeting edges provides an outwardly exposed reentrant angle into which an electrode such as that shown at 28 in FIG. 1 can be expeditiously fitted during the generation of the desired heat.

Because of the simple nature of the electrode 28, the peripheral contour of the container structure can be of any desired curvature. Whatever this curvature may be, a strip of appropriate metal can be bent or curved with relative simplicity and at low cost to define an electrode of the character shown at 28.

Many of the structural details of the apparatus have been omitted since they are well known to those skilled in the art. It is to be understood, also, that these details may be varied in some respects without necessarily departing from the spirit and scope of the invention as expressed in the appended claims.

What is claimed is:

1. The method of fusing a plastic-coated cross wall of a container to a plastic-coated side wall thereof, which consists in bringing said walls into edge-to-edge relation with the margin of one wall partially overlying the peripheral edge of the other, thereby forming an outwardly exposed reentrant angle between the peripheral edges of said walls, and generating a fusion-producing high frequency field in a diagonal direction from the apex of said reentrant angle inward toward the line of intersection of the inner surfaces of said walls, said field being produced simultaneously along the entire length of said reentrant angle and said field being in a plane arranged at an angle to the planes containing said walls.

2. The method set forth in claim 1, in which it is the cross wall which partially overlies the peripheral edge of the side wall.

3. An apparatus for fusing a plastic-coated cross wall of a container to a plastic-coated side wall thereof, comprising a retaining structure having a size and shape allowing said side wall to be fitted snugly around it with a peripheral edge facing upward, said cross wall being applicable to said side wall in edge-to-edge relation with the margin of one wall partially overlying the peripheral edge of the other thereby forming an outwardly exposed reentrant angle between the peripheral edges of said walls, and means for generating a fusion-producing high frequency field in a direction from the apex of said reentrant angle diagonally inward toward the line of intersection of the inner surfaces of said walls, said means including an inner electrode configured to fit into the corner defining said line of intersection, and a complementary outer electrode having a substantially squared edge adapted to fit into said reentrant angle along the entire length of the latter.

4. An apparatus as defined in claim 3 wherein said outer electrode has a substantially rectangular cross-sectional shape.

References Cited

UNITED STATES PATENTS

| | | | |
|---|---|---|---|
| 2,471,612 | 5/1949 | Freeman | 156—273 XR |
| 2,595,501 | 5/1952 | Aicher | 156—273 XR |
| 2,903,543 | 9/1959 | Rueggeberg | 156—380 XR |
| 3,142,601 | 7/1964 | Polk et al. | 156—273 |

OTHER REFERENCES

Sobotka, H., Industrial HF Heat Generators, Philips Technical Library, The Netherlands (1963), pp. 5-7 relied on.

EARL M. BERGERT, *Primary Examiner.*

GEORGE O. RALSTON, *Examiner.*

W. E. HOAG, *Assistant Examiner.*